UNITED STATES PATENT OFFICE.

CHESTER E. ANDREWS, OF PITTSBURGH, PENNSYLVANIA.

SYNTHETIC MANUFACTURE OF THYMOL.

1,306,512.      Specification of Letters Patent.      Patented June 10, 1919.

No Drawing.      Application filed September 15, 1917.     Serial No. 191,607.

*To all whom it may concern:*

Be it known that I, CHESTER E. ANDREWS, a citizen of the United States, residing at Pittsburgh, in the county of Allegheny and State of Pennsylvania, have invented certain new and useful Improvements in Synthetic Manufacture of Thymol, of which the following is a specification.

The present invention relates to the production of thymol from amino cymene. Amino cymene is 1-methyl-2-amino-4-isopropyl-benzene.

The process of converting amino cymene into thymol is preferably carried out as follows: Amino cymene is first treated with some agent capable of blocking off or otherwise rendering the amino group inactive. For this purpose the amino cymene may be added to about one and one-half to two molecular equivalents of glacial acetic acid. The mixture is heated to boiling for 15 to 20 hours in a vessel provided with a reflux condenser. The mixture upon cooling solidifies. The result of this step is to substitute the acetyl group for one of the hydrogen atoms of the amino group.

The mono acetyl amino cymene is now nitrated. This operation can be carried out preferably as follows. 19 parts of the acetyl amino cymene are dissolved in 84 parts of sulfuric acid of about 98% strength and the mixture cooled to 0° C. A nitrating mixture containing 13 parts of sulfuric acid of 98% strength and 10 parts of nitric acid of 70% strength is then added to the above mixture, while vigorously stirring and while maintaining the reaction mass at about 0° C. It is essential that the temperature be kept down during this operation. By the time all of the nitrating acid has been added, the nitrating operation is complete. The mixture is then dumped into a large quantity of ice water, that is to say, water containing cracked ice which is being constantly stirred. This gives a yellow precipitate of para nitro acetyl amino cymene. This mixture may be purified if desired, by recrystallization from a suitable solvent such as glacial acetic acid or alcohol.

The amino acetyl group is now removed and hydrogen substituted therefor. This may be effected by first boiling the para nitro acetyl amino cymene with 50 parts of concentrated hydrochloric acid until completely dissolved, when upon cooling brown crystals of the hydrochlorid of para nitro amino cymene are produced. This material is then diazotized in the usual manner by treating with sodium nitrite in acid solution and the diazo body reduced by boiling with alcohol or with alkaline tin chlorid solution, or with other relatively gentle reducing agents. It is not my intention to reduce the nitro group during this operation.

This produces 1-methyl-3-nitro-4-isopropyl-benzene, and in this compound the nitro group is next reduced, for example by treatment with iron and hydrochloric acid, or by other acid reducing agents, or if desired by hydrogen and a catalyzer, producing the amino compound.

The amino compound is diazotized by treatment with sodium nitrite and the product is boiled with water, to produce the hydroxyl derivative, 1-methyl-3-hydroxy-4-isopropyl-benzene, or thymol.

The thymol can be separated from the solution by steam distillation, or it may be separated by extraction with suitable solvents or in any other appropriate manner.

I do not limit myself to the exact conditions stated above, although they have been found to give good results.

The reactions which take place in the process are conveniently expressed as follows:

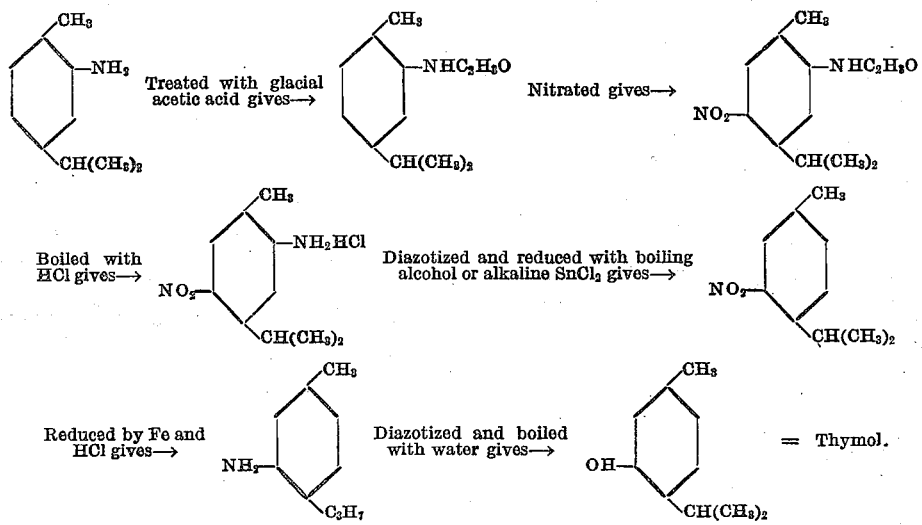

I claim:

1. A process of making thymol which comprises acetylating 1-methyl-4-isopropyl-2-amino-benzene, nitrating the product whereby the nitro group enters in a position meta to the methyl group; heating the remaining body with a mineral acid, diazotizing and reducing the diazo group to reintroduce hydrogen; thereafter reducing the nitro group to amino, diazotizing and hydrolyzing to substitute an OH radical, and then separating the thymol from the liquor.

2. A process of making thymol which comprises treating 1-methyl-2-amino-4-isopropyl-benzene with an acetylating agent, nitrating the product, eliminating the amino group residue, reducing the nitro compound, diazotizing and hydrolyzing the product.

3. A process of making thymol which comprises rendering inactive the amino group of amino cymene, nitrating the product, to produce a nitrated amino cymene compound, and thereafter removing the amino group and substituting OH in place of the $NO_2$.

In testimony whereof I affix my signature.

CHESTER E. ANDREWS.